May 2, 1961   H. J. TYLER   2,982,838
THERMOSTATICALLY CONTROLLED SOLDERING IRON
Filed Sept. 1, 1959

United States Patent Office 2,982,838
Patented May 2, 1961

2,982,838
THERMOSTATICALLY CONTROLLED SOLDERING IRON

Hugh J. Tyler, Jeannette, Pa., assignor to Robertshaw-Fulton Controls Company, Richmond, Va., a corporation of Delaware Filed Sept. 1, 1959, Ser. No. 837,382

3 Claims. (Cl. 219—26)

This invention relates to thermostatically controlled soldering irons and, more particularly, to soldering irons of the type in which an electric heater is controlled by a thermostatic switch to prevent the temperature of the soldering iron from exceeding a predetermined amount.

Line voltage variations, inexperienced operators, and inability to estimate soldering iron temperatures have led to many soldering irons being damaged by overheating. In the past, temperature control of the soldering iron has been accomplished by laying the soldering iron on a thermostatically controlled stand or by providing a bulky thermostat in the soldering iron.

An object of this invention is to utilize a miniature thermostat to control the soldering iron without adding appreciable weight or size.

Another object of this invention is to facilitate replacement of the thermostatic means by utilizing a simple and novel construction which permits certain portions to be removed.

A further object of this invention is to allow the thermostatic switch to be readily calibrated in a simple, yet efficient manner.

Still another object of this invention is to eliminate lead wires within the soldering iron by utilizing portions of the support structure as conductors.

In the preferred embodiment of this invention, a thermostatic probe is formed from a rod and a tube, which are constructed from materials having different coefficients of thermal expansion. A switch is connected through high temperature solder joints to the rod and tube whereby the relative movement between the rod and tube opens the switch at a predetermined temperature to deenergize an electrical heating coil. The probe is disposed near the heating coil and adjacent to the soldering tip so as to be substantially responsive to the temperature of the tip. The probe is further provided with connectors which allow the probe to be detached when the tip assembly is unscrewed from the handle.

Figure 1:
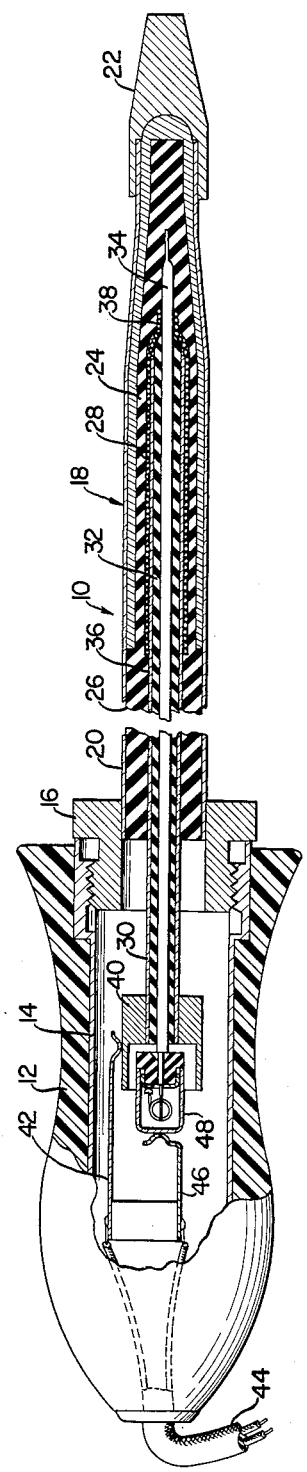
Figure 2:
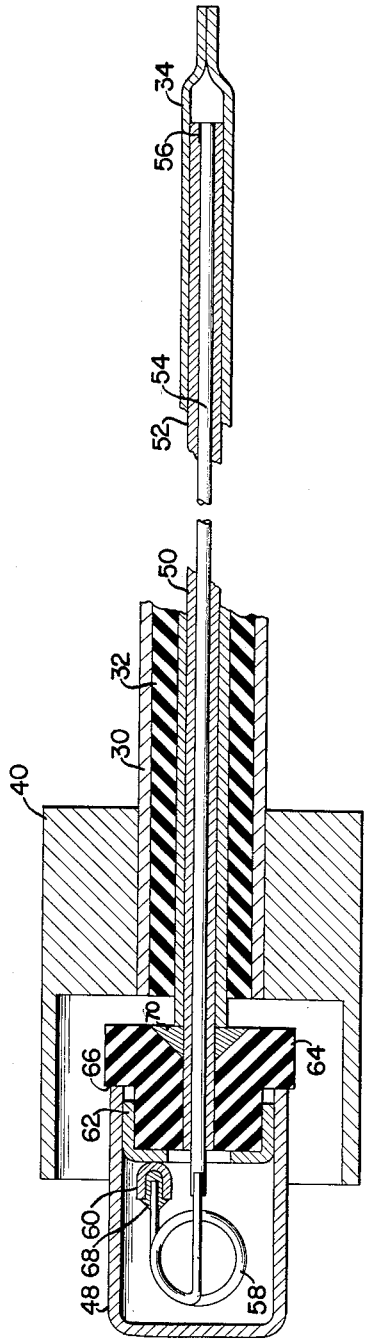

Other objects and advantages of this invention will be apparent from the following description taken in connection with the accompanying drawings wherein:

Fig. 1 is a partial longitudinal cross-sectional view of the preferred embodiment of this invention; and Fig. 2 is an enlarged longitudinal cross-sectional view of a detail shown in Fig. 1.

Referring now more particularly to the drawings, a soldering iron, indicated generally by reference numeral 10 in Fig. 1, is provided with a hollow handle 12, constructed from wood or other suitable insulating material, which is strengthened by a tubular insert 14. A tip assembly 18 is detachably connected to handle 12 by a nut 16 which is screwed into one end of insert 14.

Tip assembly 18 generally comprises a plurality of coaxial tubular members which include an outer metallic tubular casing 20 fixed at one end to nut 16 and formed at the other end with a reduced diameter portion on which a soldering tip 22 is mounted. A tubular copper sheath 24 is disposed between the tip portions of casing 20 and a tubular insulation sheath 26.

Electrical heating means comprising a high resistance wire heater 28 is helically wound around the end portion of a tubular conductor 30. The heater 28 generally underlies sheath 24. Conductor 30 has a tubular insulator 32 disposed therein which surrounds a tubular metallic lead 34. One end of heater 28 is connected to conductor 30 at 36 and the other end is connected to member 34 at 38. The intermediate coils of heater 28 are insulated from conductor 30 by a layer of insulation (not shown) or alternatively, by providing the wire of heater 28 with a suitable insulating covering.

As viewed in Fig. 1, the left ends of conductor 30, insulator 32 and lead 34 extend through nut 16, beyond the left ends of casing 20 and sheath 26, into handle 12. A terminal 40 is fixed on the end of conductor 30 and is adapted to slidably engage a flexible contact blade 42 connected to one side of a power source through cord 44. The other side of the power source is connected through cord 44 to another contact blade 46 which is adapted to abut a generally cup-shaped terminal 48. Lead 34, in addition to serving as a conductor, is a heat or thermostatic well into which a thermostatic probe 50 is inserted.

Probe 50, as best seen in Fig. 2, comprises a coaxial tube 52 and rod 54 which are welded or otherwise joined at ends 56. The other end of rod 52 is formed with an extension which projects beyond the corresponding end of tube 52 and is connected to one end of a coil 58 that has a contact 60 mounted on the other end thereof. Rod 52 is preferably constructed from a material having a higher coefficient of thermal expansion than the material from which tube 52 is constructed so that the unjoined ends move relative to one another in response to changes in temperature of tube 52 and rod 54.

A contact 62 is mounted on the reduced end portion of an annular insulator 64 formed with an axial bore through which rod 54 and tube 52 pass. Terminal 48 is detachably mounted on contact 62 and abuts a shoulder portion 66 of insulator 64.

Contact 60 is connected to coil 58 through a high temperature solder joint 68 and tube 52 and lead 34 are connected to insulator 64 by a high temperature solder joint 70. Although lead 34 and probe 50 are close, the primary contact therebetween is made through joint 70. It should be noted that contact 60, being connected to rod 54, is movable relative to contact 62, which is connected to tube 52, in response to changes in temperature of probe 50.

Prior to assembly, the device is calibrated by inserting thermostatic probe 50 into a calibration bath maintained at a temperature corresponding to the temperature at which it is desirable to shut off heater 28. Probe 50 is held vertically within the bath. Upon reaching the temperature of the bath, the high temperature solder joint 68 is melted. If contact 60 abuts contact 62 and stresses coil 58, the melting relieves the stress within coil 58. If contact 60 is above contact 62, the melting of joint 68 causes contact 60 to fall by gravity against contact 62. Subsequent cooling and solidifying of joint 68 calibrates the switch so that when probe 50 subsequently reaches the temperature of the bath, contacts 60 and 62 will be at the point of separation and further increases in temperature will break contact therebetween.

In operation, assuming that soldering iron 10 is cool, cord 44 is connected to a suitable power source to complete a circuit through soldering iron 10 which serially consists of contact blade 42, terminal 40, conductor 30, heater 28, lead 34, solder joint 70, tube 52, rod 54, coil 58, solder joint 68, contact 60, contact 62, terminal 48, and contact blade 46. The heat generated by heater 28 is conducted to tip 22 and is also conducted to thermostatic probe 50. As probe 50 heats, tube 52 and rod 54 expand at different rates gradually relieving the stress in coil 58 until at the desired temperature, contact 60 disengages contact 62 to shut off the supply of electric current to heater 28. Subsequent decreases in temperature remake the circuit. The soldering iron 10 cycles in this manner to maintain the soldering tip temperature below that of the calibration point.

Alternative methods may be used to allow probe 50 to be readily detached from tip assembly 18. In the first method, the connection 38 between heater 28 and lead 34 is merely frictional, that is, the heater is not soldered or otherwise rigidly secured to lead 34, so that lead 34 may be readily inserted or withdrawn. In the second method of connecting probe 50 to tip assembly 18, it is necessary to melt solder joint 70 each time probe 50 is inserted or removed.

This readily detachable connection provides several advantages. If, for some reason, the thermostatic probe 50 becomes damaged, it is merely necessary to buy a new probe, rather than a whole soldering iron, to replace the damaged unit. Furthermore, the user may wish to have several probes calibrated for different temperatures for use with various solders. In such a case, it is merely necessary to insert the probe corresponding to the desired temperature.

Many changes and modifications may be made in the construction and arrangement of parts without departing from the scope of the invention as defined in the appended claims.

I claim:

1. In a replaceable temperature responsive element for controlling the operating temperature of an electrically heated soldering iron, the combination comprising a thermostatic probe responsive to changes in temperature for controlling the actuation of an electrically powered heating means, said probe including a coaxial rod and tube portion joined at one of their respective ends, the free end of said rod extending beyond the corresponding free end of said tube, an annular insulator having an axial bore adapted to receive said coaxial rod and tube therethrough and a reduced end portion defining a shoulder, a cup-shaped contact element positioned on said reduced end portion and having an aperture in the end wall thereof adapted to receive the free end of said rod therethrough, a coil member having one of its ends mounted on said free end of said rod, a contact carried on the opposite end of said coil and adapted to engage said cup-shaped contact in response to variations in a temperature condition, a cup-shaped terminal member overlying said coil and said cup-shaped contact and positioned to engage said shoulder, and a contact blade connected to a power source and cooperable with said cup-shaped terminal member for forming a flow path for electrical energy therethrough.

2. In a thermostatically controlled electrically heated soldering iron, the combination comprising a substantially hollow handle member, a tubular insert having an internally threaded portion adjacent one end thereof within said handle, a tip assembly comprising a plurality of coaxial tubular members including an outer metallic tubular casing, an externally threaded nut fixed at one end of said casing adapted for attachment to said handle member, an area of reduced diameter formed at the other end of said casing, a soldering tip mounted on said reduced end portion, a tubular copper sheath disposed within said outer metallic tubular casing, a tubular insulating sheath disposed within said copper sheath, a tubular conductor within said insulating sheath, a helically wound electrical heating means comprising a high resistance wire positioned around and electrically connected to a tubular conductor, said heater and said conductor positioned within said tubular insulating sheath and coaxial therewith, a tubular insulator disposed within said conductor, a removable temperature responsive probe positioned within said tubular insulator and said conductor for controlling the flow of electrical energy to said heating means in accordance with a temperature condition, said probe being mechanically and electrically connected to said heating means whereby a flow path for electrical energy is provided, and switch means operatively mounted on one end of said probe movable between open and closed positions for controlling the flow of electrical energy in accordance with variations in a temperature condition.

3. In a control for regulating the operating temperature of an electrically heated soldering iron, the combination comprising replaceable sensing means responsive to changes in a temperature condition, switch means operatively associated with said sensing means for controlling the flow of electrical energy to said heater in accordance with variations in said temperature condition, said sensing means including a thermostatic probe comprising a coaxial rod and tube constructed of materials having different coefficients of expansion and joined at one of their respective ends, a helically wound high resistance wire heater disposed around said probe and having selected convolutions of said heater mechanically and electrically connected to said probe forming a conductor for electrical energy flowing through said high resistance wire, and said switch means comprising a helically wound coil having its free ends extending outwardly in a common direction, one of said ends integrally associated with the free end of said rod, a contact carried on said other end of said coil being provided with a switch adapted to open and close in response to variations in temperature for controlling the flow of electrical energy to said heater.

References Cited in the file of this patent

UNITED STATES PATENTS

| | | |
|---|---|---|
| 1,111,652 | Fryling | Sept. 22, 1914 |
| 1,678,407 | Spencer | July 24, 1928 |
| 2,332,212 | Fillo | Oct. 19, 1943 |
| 2,475,376 | Darling | July 5, 1949 |
| 2,908,793 | Aloi | Oct. 13, 1959 |

FOREIGN PATENTS

| | | |
|---|---|---|
| 663,214 | Great Britain | Dec. 19, 1951 |